(12) United States Patent
Niess et al.

(10) Patent No.: US 11,796,071 B2
(45) Date of Patent: *Oct. 24, 2023

(54) DIAPHRAGM FILTER

(71) Applicant: Rain Bird Corporation, Azusa, CA (US)

(72) Inventors: Peter M. Niess, Vale, AZ (US);
Michael A. McAfee, Tucson, AZ (US);
Gokhan Aydar, Tucson, AZ (US);
Sarath Chandran, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 16/922,620

(22) Filed: Jul. 7, 2020

(65) Prior Publication Data

US 2020/0332906 A1    Oct. 22, 2020

Related U.S. Application Data

(63) Continuation of application No. 15/261,531, filed on Sep. 9, 2016, now Pat. No. 10,731,764.

(51) Int. Cl.
| | | |
|---|---|---|
| *B01D 35/157* | (2006.01) | |
| *F16K 7/17* | (2006.01) | |
| *B01D 29/00* | (2006.01) | |
| *B01D 29/60* | (2006.01) | |
| *F16K 7/12* | (2006.01) | |
| *F16K 31/126* | (2006.01) | |

(52) U.S. Cl.
CPC ............ *F16K 7/12* (2013.01); *F16K 31/1262* (2013.01)

(58) Field of Classification Search
CPC ...... B01D 2201/162; B01D 2201/4015; B01D 29/0095; B01D 29/606; B01D 35/1573; F16K 7/17

See application file for complete search history.

(56) References Cited

U.S. PATENT DOCUMENTS

| | | | |
|---|---|---|---|
| 4,477,051 | A | 10/1984 | Ben-Yehuda |
| 4,882,055 | A | 11/1989 | Stamstad |
| 5,213,303 | A | 5/1993 | Walker |
| 5,213,305 | A | 5/1993 | Whiteside |
| 5,522,769 | A | 6/1996 | DeGuiseppi |
| 5,645,264 | A | 7/1997 | Kah |
| 5,887,848 | A | 3/1999 | Wilson |
| 5,967,182 | A | 10/1999 | Wilson |
| 5,996,608 | A | 12/1999 | Hunter |
| 6,182,689 | B1 | 2/2001 | Lauer |

(Continued)

OTHER PUBLICATIONS

Excerpt of drawing No. C-170368-E, "Filter, Solenoid." Rain Bird Corporation, illustrating a product publically disclosed at least before Sep. 9, 2016, 1 page.

(Continued)

*Primary Examiner* — Dirk R Bass
(74) *Attorney, Agent, or Firm* — Fitch, Even, Tabin & Flannery, LLP

(57) ABSTRACT

There is provided a filter for a diaphragm valve. The filter attaches to a diaphragm of the valve and filters fluid entering a control chamber in the valve. The filter includes internal structure that increases the path from where fluid enters the filter through a mesh of holes to a single exit flow path leading to the control chamber. This increased path reduces the potential for debris in the flow to clog the exit flow path from the filter.

30 Claims, 10 Drawing Sheets

(56) References Cited

U.S. PATENT DOCUMENTS

| | | |
|---|---|---|
| 6,216,730 B1 | 4/2001 | Hall |
| 6,260,576 B1 | 7/2001 | Allen |
| 6,616,119 B2 | 9/2003 | Wilson |
| 6,971,634 B2 | 12/2005 | Funari |
| 7,108,240 B2 | 9/2006 | Funari |
| 7,201,187 B2 | 4/2007 | Irwin |
| 7,475,863 B2 | 1/2009 | Donovan |
| 7,503,348 B2 | 3/2009 | Irwin |
| 7,516,938 B2 | 4/2009 | Funari |
| 7,552,906 B2 | 6/2009 | Irwin |
| 7,694,934 B2 | 4/2010 | Irwin |
| 7,980,528 B2 | 7/2011 | Wilson |
| 8,286,934 B2 | 10/2012 | Wilson |
| 8,632,048 B2 | 1/2014 | Wilson |
| 8,740,177 B2 | 6/2014 | Walker |
| 9,222,584 B2 | 12/2015 | Bush |
| 9,228,662 B2 | 1/2016 | Bush |
| 2007/0057212 A1 | 3/2007 | Hao-Yao |
| 2008/0029722 A1 | 2/2008 | Irwin |
| 2015/0144815 A1 | 5/2015 | Walker |
| 2016/0076667 A1 | 3/2016 | Bush |
| 2016/0083947 A1 | 3/2016 | Bush |

OTHER PUBLICATIONS

Excerpt of drawing No. C-231768-C, "Filter, Diaphragm." Rain Bird Corporation, illustrating a product publically disclosed at least before Sep. 9, 2016, 1 page.

Excerpt of drawing No. C-232776-A4, "Elliptical Filter." Rain Bird Corporation, illustrating a product publically disclosed at least before Sep. 9, 2016, 1 page.

Picture of 1-½" PGV (Filter in center), Hunter Industries, Inc., illustrating product publicly disclosed at least before Sep. 9, 2016, 1 page.

Picture of 100P3 (Fabric reinforced, hemispherical stainless filter—other models have cylindrical filter of same material), Irritrol, illustrating product publicly disclosed at least before Sep. 9, 2016, 1 page.

Picture of 216B (Hole in center), Irritrol, illustrating product publicly disclosed at least before Sep. 9, 2016, 1 page.

Picture of 252-26-06 (Hole in center, fabric reinforced), the Toro Company, illustrating product publicly disclosed at least before Sep. 9, 2016, 1 page.

Picture of 300 BPES (Fabric reinforced stainless steel filter), Rain Bird Corporation, illustrating product publicly disclosed at least before Sep. 9, 2015, 1 page.

Picture of ICV-301 (Fabric reinforced, fabric filter), Hunter Industries, Inc., illustrating product publicly disclosed at least before Sep. 9, 2016, 1 page.

Picture of P-220-26-00 (Fabric reinforced, hemispherical stainless filter—other models have cylindrical filter of same material), the Toro Company, illustrating product publicly disclosed at least before Sep. 9, 2016, 1 page.

Picture of SB-15 (Two small holes in the diaphragm), Weathermatic, illustrating product publicly disclosed at least before Sep. 9, 2016, 1 page.

Pictures 1 and 2 of 1" PGV (Filter around edge of center white component), Hunter Industries, Inc., illustrating product publicly disclosed at least before Sep. 9, 2016, 1 page.

Pictures 1-4 of 1" FloPro (Filter device (white) attached to diaphragm), the Toro Company, illustrating product publicly disclosed at least before Sep. 9, 2016, 1 page.

Pictures 1-4, (Filter (white) attached to diaphragm), Rain Bird Corporation, illustrating product publicly disclosed at least before Sep. 9, 2015, 1 page.

Pictures 1-5, (Filter (white) attached to diaphragm), Rain Bird Corporation, illustrating product publicly disclosed at least before Sep. 9, 2015, 1 page.

Pictures 1-6 of 1" FPT (Filter (white) attached to diaphragm), Orbit Irrigation Products, Inc., illustrating product publicly disclosed at least before Sep. 9, 2016, 1 page.

USPTO; U.S. Appl. No. 15/261,531; Notice of Allowance dated Apr. 1, 2020; (pp. 1-5).

USPTO; U.S. Appl. No. 15/261,531; Office Action dated Mar. 15, 2019; (pp. 1-10).

USPTO; U.S. Appl. No. 15/261,531; Office Action dated Oct. 4, 2018; (pp. 1-8).

USPTO; U.S. Appl. No. 15/261,531; Office Action dated Nov. 25, 2019; (pp. 1-9).

DIAPHRAGM FILTER

CROSS-REFERENCE TO RELATED APPLICATIONS

This application is a continuation of and claims priority to prior application Ser. No. 15/261,531, filed Sep. 9, 2016, which is herein incorporated by reference.

FIELD

The present invention relates to diaphragm valves and, more particularly, to a filter for pilot flow to a control chamber of diaphragm valves.

BACKGROUND

Fluid systems, such as irrigation systems, are controlled by components, such as valves, upstream in the system. Irrigation control valves typically utilize a solenoid to open and close the valve and to ensure optimal opening and closing times. In operation, when the solenoid is off, a pilot flow path to a downstream side of the valve is closed so that flow builds pressure in a control chamber to close the valve. When the solenoid is energized, the pilot flow path to the downstream side of the valve is open, which releases pressure in the control chamber and allowing the valve to open.

The inlet and exit flow area or diameter for the pilot flow path is important. Pilot flow is the flow that enters into the control chamber, which is the area above the diaphragm, and exits the control chamber through a path to the downstream side of the valve. The path is controlled by a solenoid valve. Normally, the inlet diameter of the pilot flow path is very small and the exit diameter is larger to create a pressure differential to allow the valve to open. The inlet area, because of its small size, can be prone to clogging by external debris or mineral deposits, so it is protected by a filter. The filter helps prevent clogging due to suspended debris and dissolved solids. If the inlet port becomes clogged, the valve will not close, which leads to large amounts of fluid to continue to flow. With current filters, failures have been seen with small debris entering the filter or water containing high amounts of dissolved calcium where water settles inside the filter either on the entry or exit of the path through the filter. This latter situation occurs after the water evaporates leaving calcium carbonate deposits behind.

It is desired to have a filter that addresses the foregoing tendencies for clogging to provide a more reliable valve.

DETAILED DESCRIPTION

Figure 1:
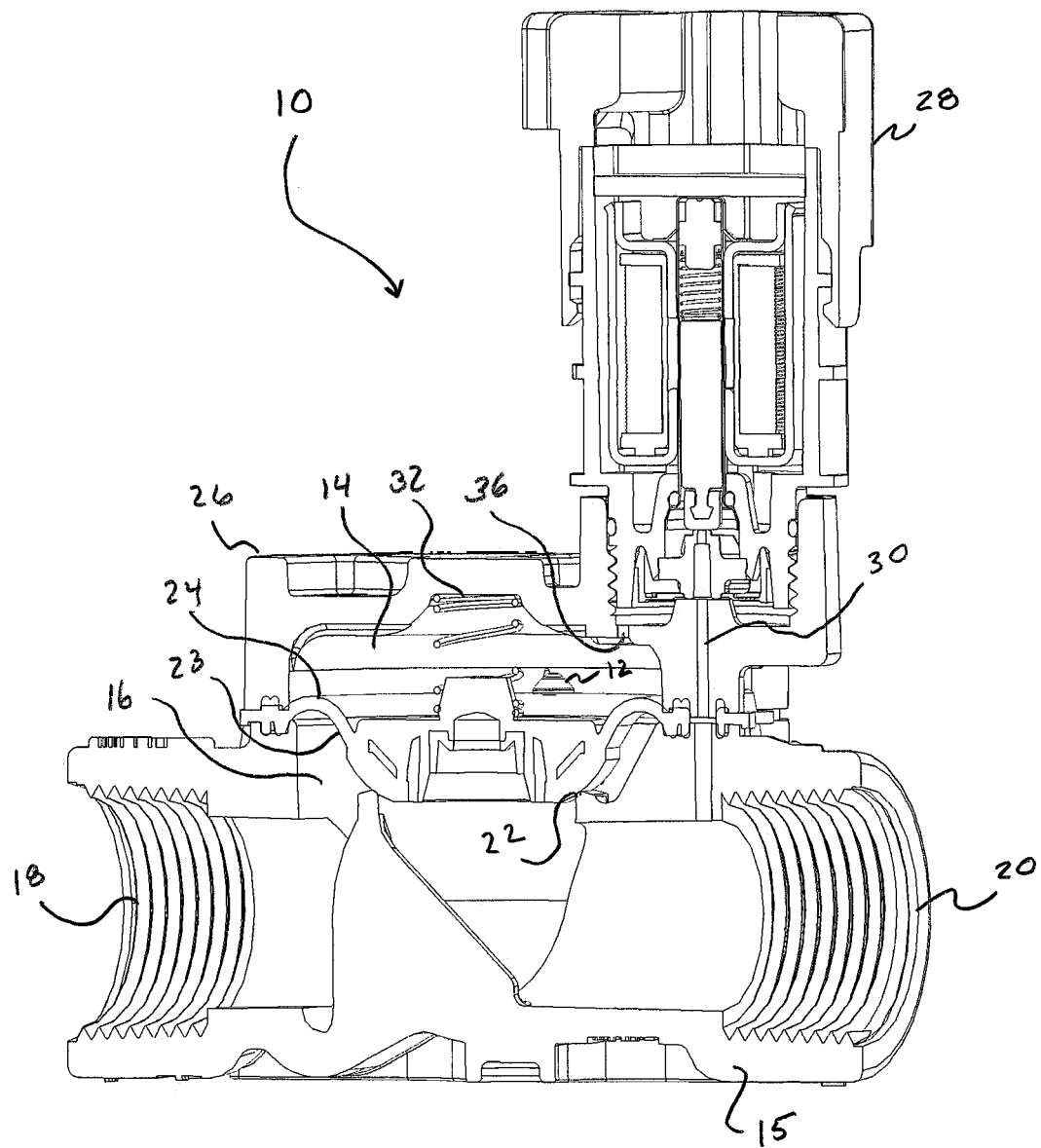
FIG. 1 is a cross-sectional view of a diaphragm valve.
Figure 2:
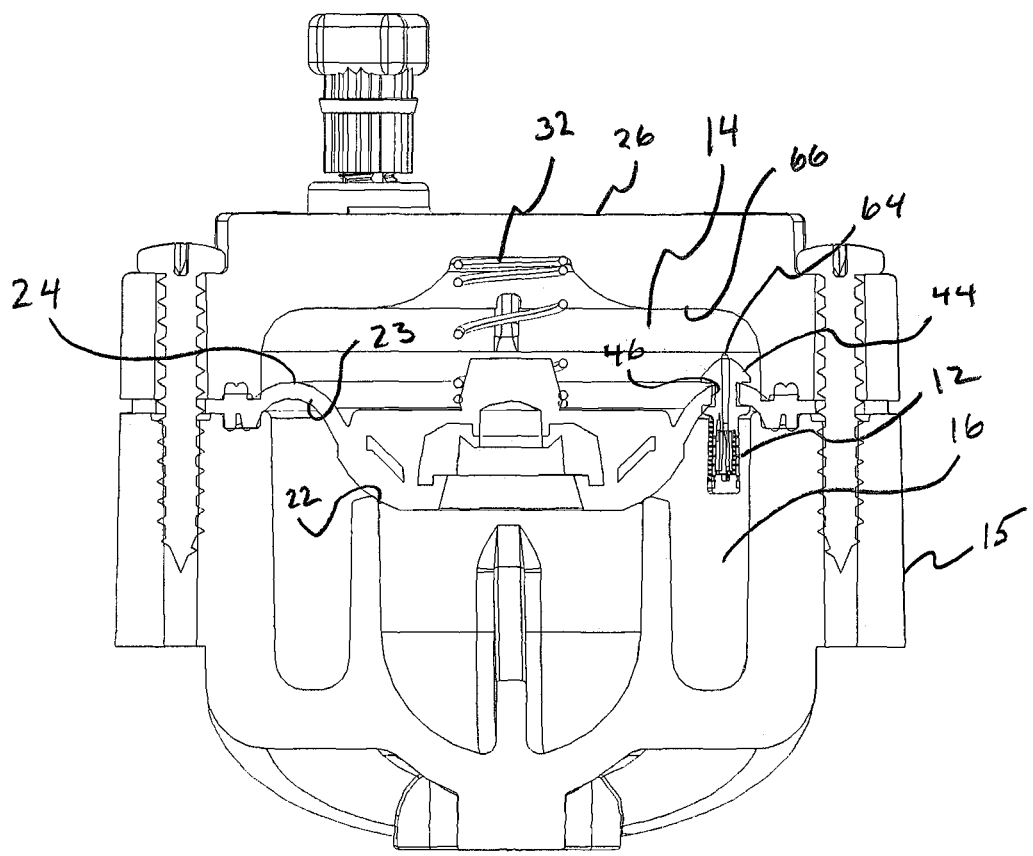
FIG. 2 is another cross-sectional view of the diaphragm valve of FIG. 1.

Referring to FIGS. 1 and 2, there is illustrated a reverse flow diaphragm valve 10 with a filter 12 mounted for fluid flowing into a control chamber 14. The control chamber 14 is important in controlling the opening and closing of the valve 10. If the filter 12 becomes clogged, the valve 10 may not function effectively. For example, the valve 10 may not close properly, thereby permitting fluid to flow when not desired. The valve 10 may be used with a variety of systems and fluids. One example is a control valve for use in an irrigation system.

The valve 10 includes a housing 15 defining a passageway 16 interconnecting an inlet 18 and an outlet 20 of the valve 10. A valve seat 22 is located along the passageway 16 and cooperates with a diaphragm 24 to control flow through the valve 10. When the diaphragm 24 is seated on the valve seat 22 (closed position), flow is prohibited through the valve 10. Conversely, when the diaphragm 24 is raised above the valve seat 22 (open position), flow is permitted through the valve 10.

The valve 10 include a bonnet 26 connected to the housing 15. The bonnet 26 and the diaphragm 24 define the control chamber 14. The fluid pressure in the control chamber 14 controls whether the diaphragm 24 is in the closed or open position relative to the valve seat 22. More specifically, a solenoid valve 28 opens and closes a pilot flow path to control the pressure in the control chamber 14. The pilot flow path begins with the filter 12, extends through the control chamber to a discharge path 30 along which is located the solenoid valve 28. The discharge path 30 terminates downstream near the outlet 20.

When the solenoid valve 28 is closed (as illustrated in FIGS. 1 and 2), the control chamber 14 is sealed and flow from the passageway 16 upstream of the valve seat 22 enters the control chamber 14 through the filter 12. During closing, pressure increases in the control chamber 14, and when the pressure exceeds the pressure on an inlet portion 23 of the diaphragm 24 (the portion surrounding the valve seat 22), the diaphragm 24 will seat on the valve seat 22 because of the larger pressurized area on the top side of the diaphragm 24. A spring 32 also assists to bias the diaphragm 24 to the closed position. When the solenoid valve 28 is opened, the pressure in the control chamber 14 will decrease because fluid will flow from the control chamber 14 to be discharged into the passageway 30 downstream of the valve seat 22 at a rate greater than fluid will flow into the control chamber 14 through the filter 12. Once the pressure in the control chamber 14 falls below a predetermined amount (the pressure on the diaphragm 24 in the control chamber plus the spring 32 bias), the diaphragm 24 will rise off of the valve seat 22, and allow flow through the passageway 16 of the valve 10.

Referring to FIGS. 3-10, a pilot inlet 34 to the pilot flow path is located in the filter 12. The pilot inlet 34 is smaller than an outlet 36 (FIG. 1) of the control chamber 14 to the discharge path 30 portion of the pilot flow path. The pilot inlet 34, because of its relatively small size, can be prone to clogging by external debris that are small enough to enter the filter 12 and that group together or mineral deposits that form in the filter 12. If the pilot inlet 34 becomes clogged, the valve 10 may not close completely and cold possibly lead to an undesired amount of fluid continuing to flow downstream. As mentioned above, one shortcoming with current filters for diaphragm valves is their tendency to become clogged due to small debris that passes into a filter and consolidates in a random fashion and forms groupings at a pilot inlet 34.

Figure 3:
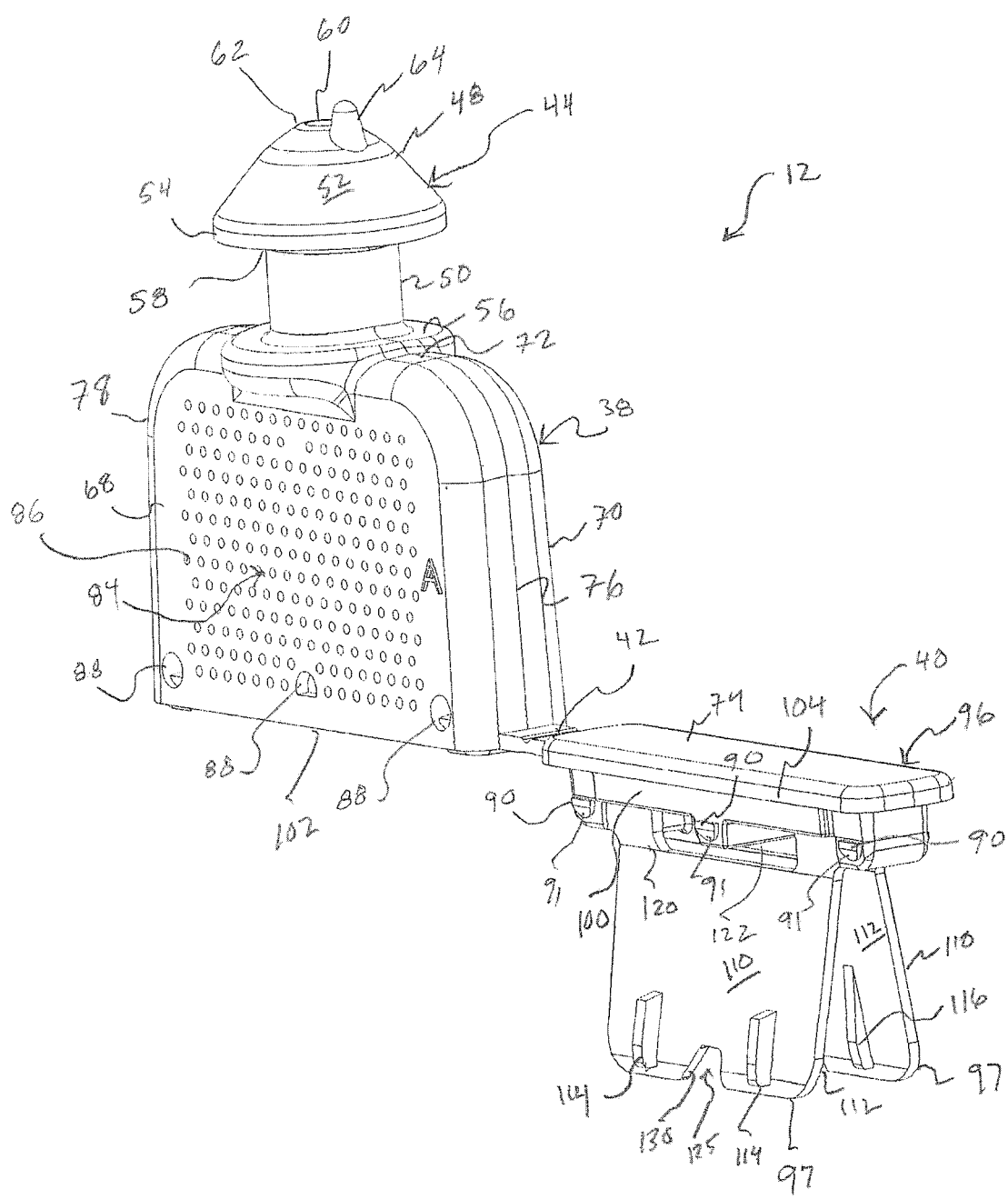
FIG. 3 is a perspective view of a filter unassembled.
Figure 4:
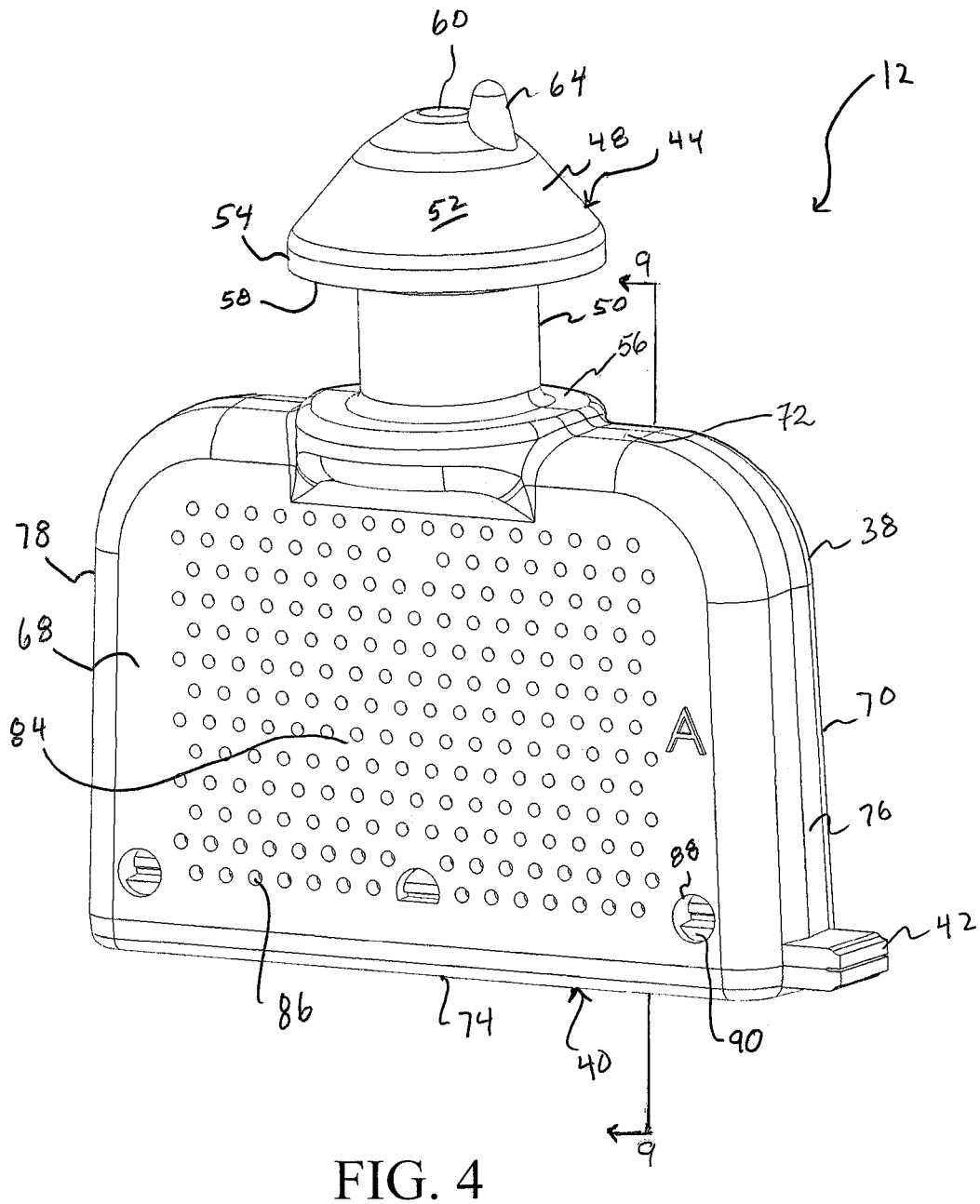
FIG. 4 is a perspective view of the filter of FIG. 3 assembled.
Figure 5:
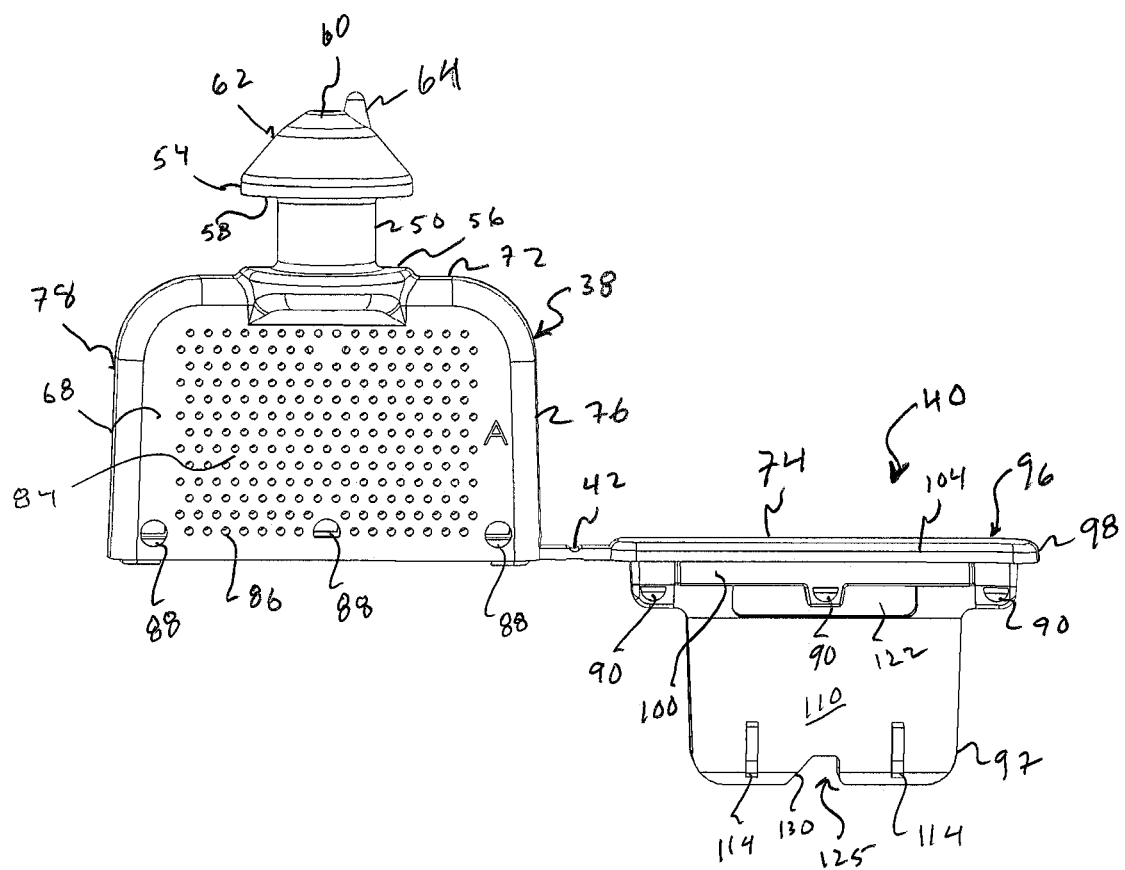
FIG. 5 is an elevational view of the filter of FIG. 3.
Figure 6:
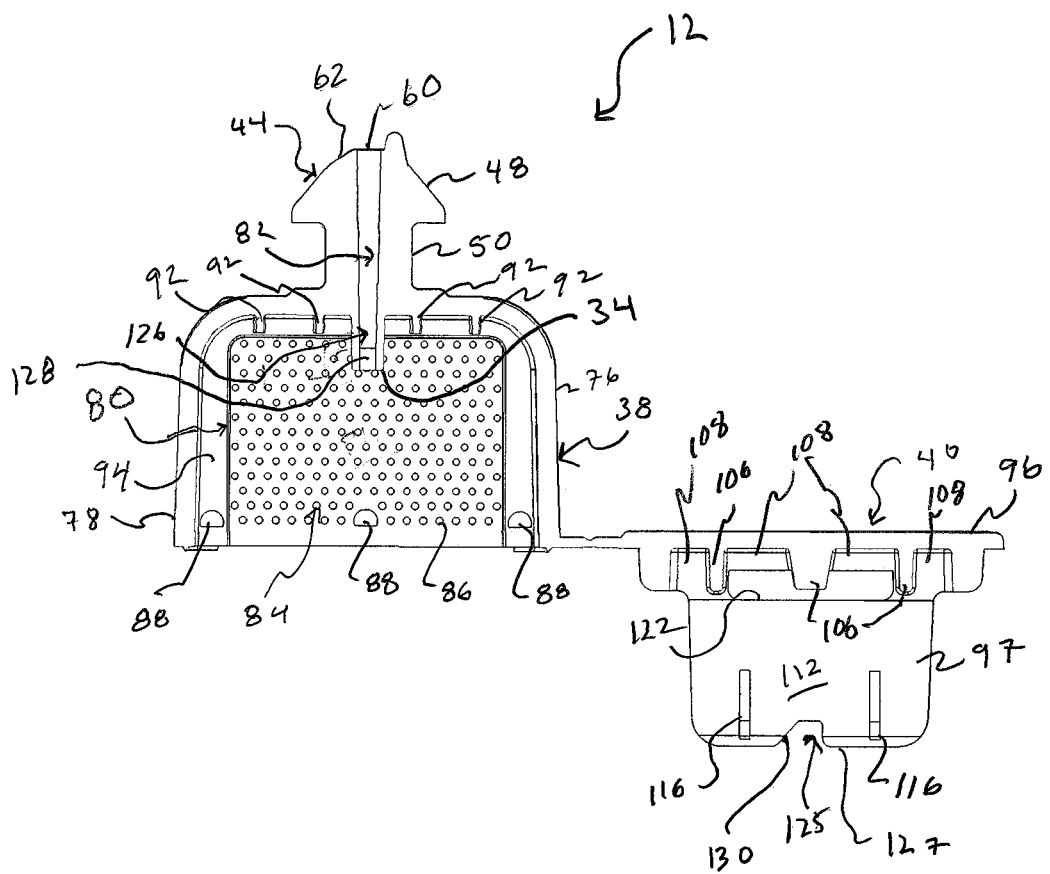
FIG. 6 is a cross-sectional view taken through the center of FIG. 5.
Figure 7:
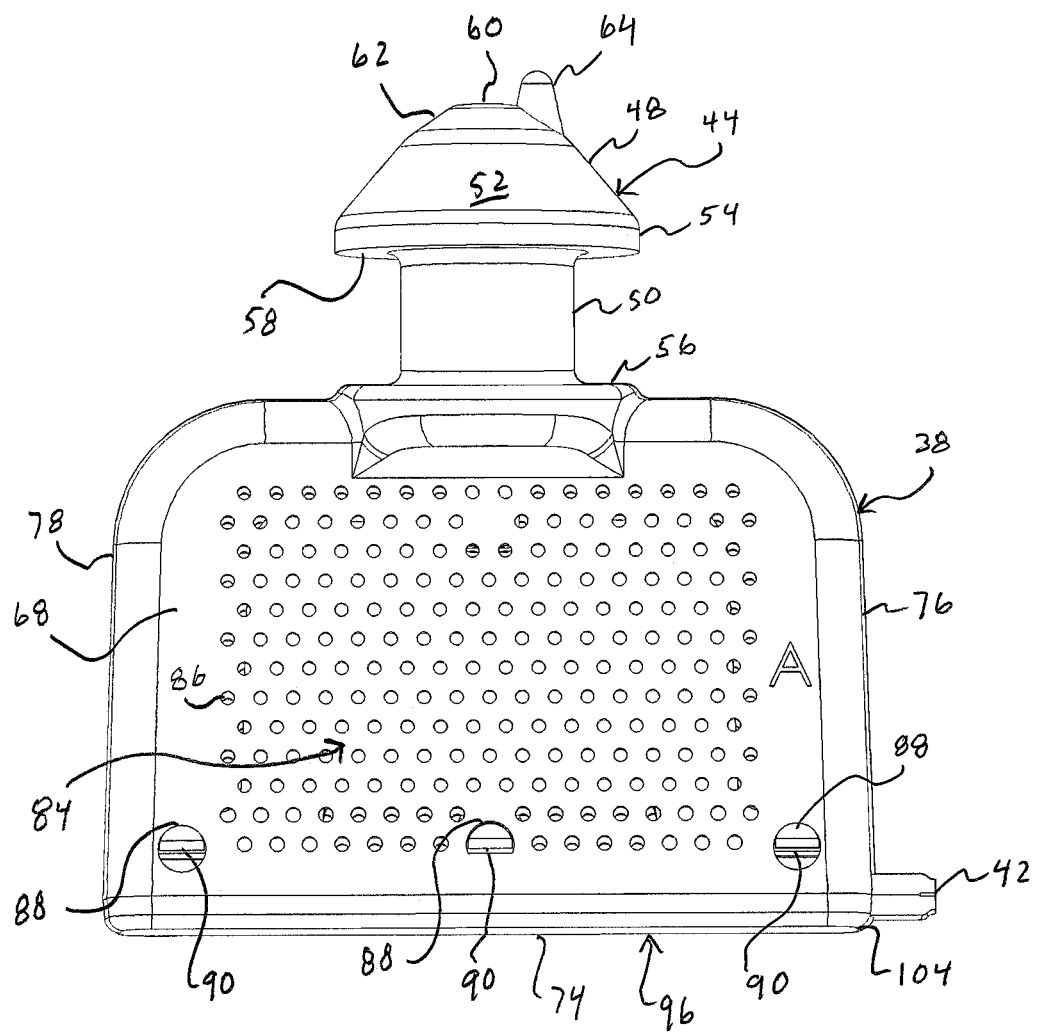
FIG. 7 is an elevational view of the filter of FIG. 3 assembled.
Figure 8:
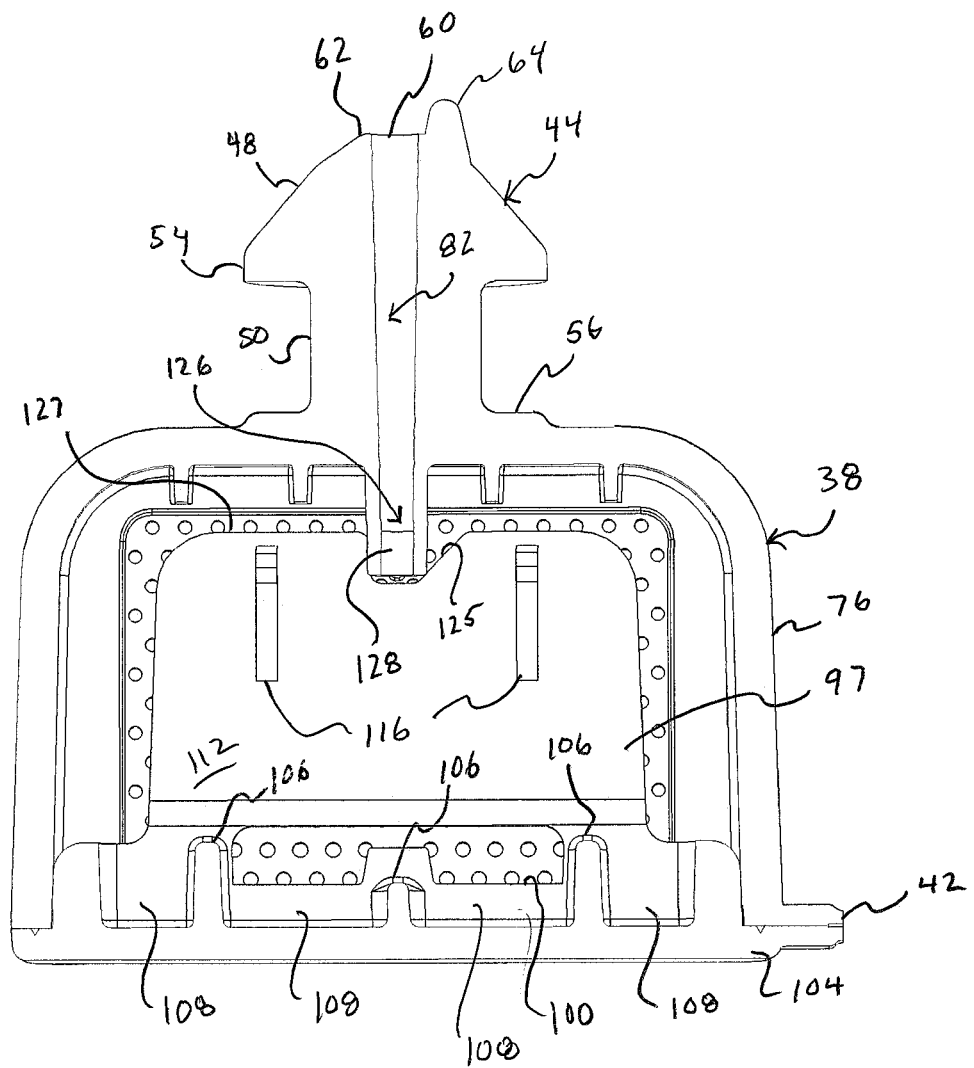
FIG. 8 is a cross-sectional view taken through the center of FIG. 7.
Figure 9:
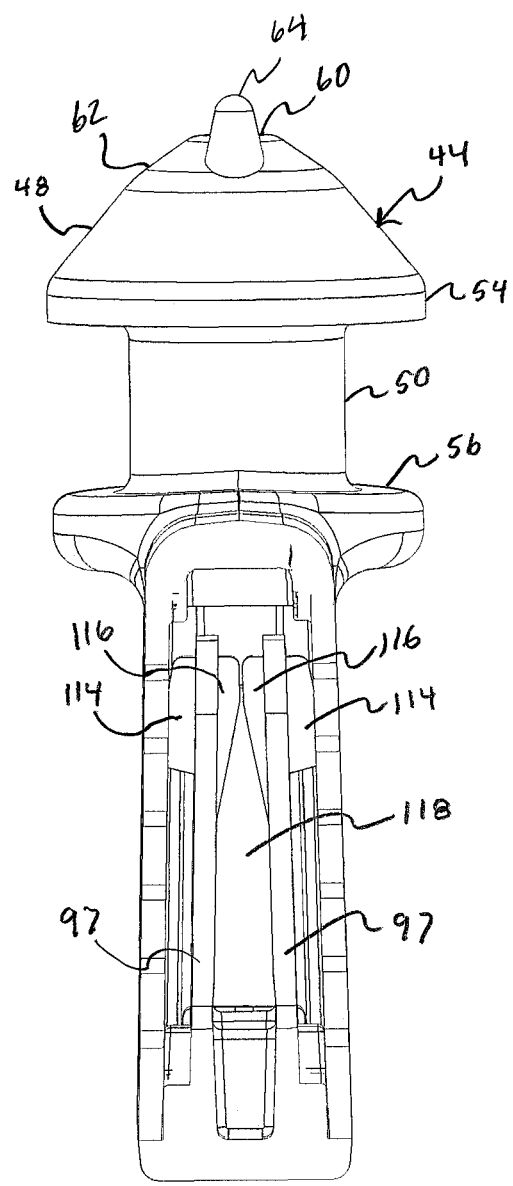
FIG. 9 is a cross-sectional view taken along line 9-9 of FIG. 4.
Figure 10:
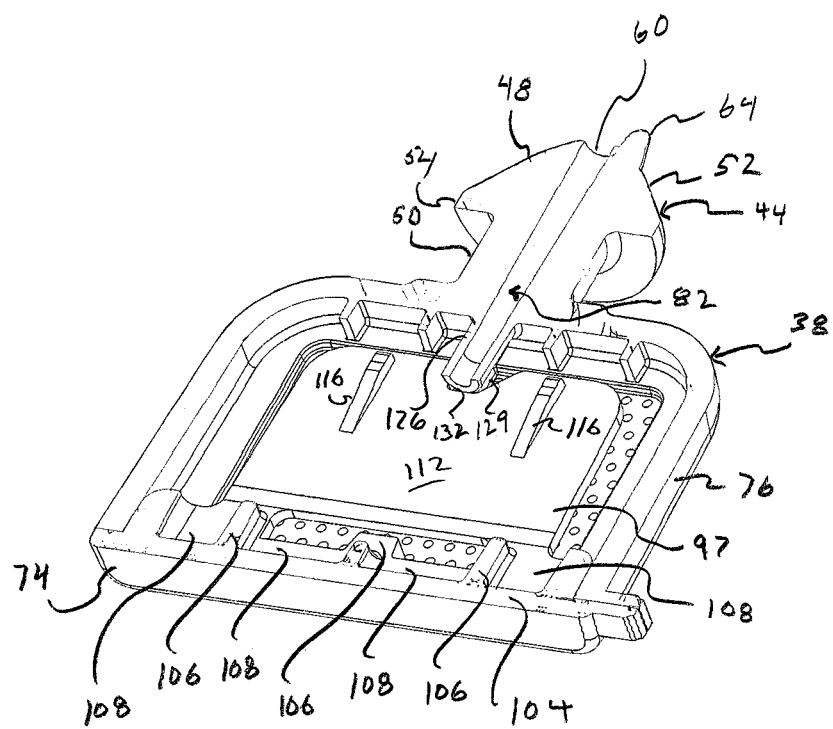
FIG. 10 is another view of FIG. 8 rotated away.

FIG. 3 shows the filter 12 in its molded and unassembled configuration and includes a housing 38 and a baffle or diverter assembly 40 interconnected by a living hinge 42. The filter 12 can be made from an engineering grade plastic material, such as Acetal Copolymer. An example of an acceptable Acetal Copolymer is Celcon® M270. To assemble the filter 12, the baffle assembly 40 is pivoted about the hinge 42 into the housing 38, as seen in FIG. 4. In one embodiment, the housing 38 in the assembled condition may have a height of about 0.350±0.005 inches, a width of about 0.498±0.005 inches, and a thickness of about 0.155±0.005 inches.

A barbed fitting 44 extends from the housing 38 and is configured to attach the filter 12 to a hole 46 (FIG. 2) formed in the diaphragm 24. The barb fitting 44 includes a barbed end 48 and a neck 50 that extends between the housing 38 and the barbed end 48. The barbed end 48 includes a conical portion 52 and a cylindrical base portion 54. At the housing 38, the neck 50 includes a shoulder 56 extends around the neck 48. The neck 48 has a smaller diameter than the cylindrical base portion 54 of the barbed end 48 which forms a step 58 that transitions between the neck 48 and the base portion 54.

The barbed end 48 is pushed through the hole 46 in the diaphragm 24 so that the diaphragm 24 is positioned between the barbed end 48 and the shoulder 56 at the base of the neck 50. The barbed end 48, neck 50 and shoulder 56 seal the hole 46 in the diaphragm 24 so that all fluid must pass through the filter 12 to enter the control chamber 14. More specifically, the hole 46 may fit tightly around the neck 50, and the portion of the diaphragm 24 around the hole 46 may be compressed between the shoulder 56 at the housing 38 and the step 58 of the transition between the neck 50 and the barbed end 48.

In one embodiment, the barbed end may have a length of about 0.100±0.005 inches and a taper angle of about 50±1 degrees from horizontal. The diameter of the cylindrical base portion may be about 0.205±0.005. The length of the neck may be about 0.0900±0.005 inches, and the diameter of the neck may be about 0.116±0.002 inches.

An outlet 60 of the filter 12 is located at a tip 62 of the barbed end 48. A projection 64 may be added. The projection 64 would extend downstream from the barbed end 48 adjacent the outlet 60. The projection 64 prevents the outlet 60 of the filter 12 from be closed in the event the diaphragm 24 raises an amount where the barbed end 48 would otherwise engage an inner surface 66 (FIG. 2) of the bonnet 26 of the valve 10, such as during manual bleeding of the pressure chamber or a very high pressure supply condition.

The filter housing 38 includes a front wall 68, back wall 70, top wall 72, bottom wall 74, right sidewall 76, and left sidewall 78. The inside of each of the front and back walls 68, 70 includes a series of structural ribs 92 at the top wall 72 and a smooth landing 94 around the mesh 84 and between the ribs 92. The housing 38 defines an internal filter chamber 80. An exit path 82 extends from the chamber 80 through the neck 50 and barbed end 48 of the barb fitting 44 to the control chamber 14. The front and back walls 68, 70 define a mesh 84 of filter holes 86. The filter holes 86 are sized to prohibit passage of debris of a predetermined size or larger from entering into the chamber 80 of the filter housing 38. In one embodiment, the mesh may consist of 210 holes per front and back wall. Each hole may be about 0.009±0.002 inches in diameter and not drafted. The other walls 72, 74, 76, 78 are solid without any holes or passages.

As part of assembling the filter 12, the baffle assembly 40 forms a snap fit with the housing 38. Along the bottom of each front and back wall 68, 70, there are three holes 88 that each receives a complementary projection 90 extending from the baffle assembly 40 in a snap fit manner to maintain the baffle assembly 40 in the assembled configuration (FIG. 4). Each projection 90 terminates with an end face that includes an angled portion 91 to assist the projection to cam into the hole 88. Two of the holes 88 on each side may have an outer circular dimension of about 0.032±0.005 inches. Each of these holes 88 may have a raised flat section extending across the hole. This raised flat section may be about 0.026±0.002 inches from the bottom of the housing. The third hole on each side may have a flat bottom that may be about 0.028±0.002 from the bottom edge of the housing. The baffle assembly 40 also could be welded to the filter housing 38 in addition to the snap fit or in place of the snap fit. The baffle assembly 40 includes a base 96 from which a pair of baffles or diverters 97 extend. The base 96 closes and seals the filter housing 38 so that debris cannot enter the filter chamber 80 except through the filter holes 86. More specifically, the base 96 of the baffle assembly 40 includes a stepped perimeter 98 with a riser 100 fitting inside an open end 102 of the housing 38 with a friction fit and a flange 104 abutting the open end 102 of the filter housing. The riser may have a height of about 0.032±0.002 inches. In the event welding is used in securing the baffle assembly 40 to the housing 38, the riser 100 also prevents debris from the welding process from entering the housing 38. The maximum width at the portion of the base 96 that fits into the housing 38 may be about 0.097±0.002 inches.

The projections 90 that seat in the holes 88 of the housing 38 to lock the base 96 in place are located adjacent the riser 100. The projections 90 seal the holes 88 so that fluid cannot enter through the snap fit. The base 96 also includes ribs 106 and recesses 108 between the ribs 106. The ribs 106 provide structural support, and the recesses 108 provided areas for debris to collect when it settles out of the flow through the filter 12.

The baffles 97 are identical, and each includes an outward facing surface 110 and an inward facing surface 112. A pair of positioning ribs 114 extend from the outward facing surface 110 to engage the front and back walls 68, 70 of the filter housing 38 to space each baffle 97 from the filter holes 86. The inward facing surface 112 includes a pair of ramps 116 that space the baffles 97 from one another when the baffles 97 are in the filter housing 38 (see FIG. 9). This provides a gap 118 between the baffles 97.

The baffles 97 include a hinge 120 that attaches them to the base 96. The hinge 97 allows the baffles 97 to pivot towards one another for insertion into the filter chamber 80 during assembly. The hinge 120 can provide the baffles 97 with a slight outward bias when in the assembled configuration. Adjacent each baffle 97 there is an elongated passage 122 between the hinge 120 and the base 96. This allows fluid to flow into the gap 118 between the baffles 97.

The barb fitting 44 defines the exit path 82 for flow from the filter 12 that terminates with the outlet 60. An inlet segment 126 of the exit path 82 extends into the filter chamber 80 between the baffles 97. The ramps 116 prevent the exit path 82 from being blocked. A notch 125 is formed inward from a top edge 127 of each baffle 97 so that the baffles 97 accommodate a support 129 for the inlet segment 126 (FIG. 10) of the exit path 82. A forward edge 130 of each notch 125 is angled to provide the necessary clearance for the baffles 97 to pivot by the support 129 during assembly. The notch 125 allows the overall size of the baffle 97 to be maximized in the chamber 80.

The inlet segment 126 has a portion 128 with a constant diameter. The remainder of the exit path 82 has an outward expanding diameter. This expansion may be at a constant rate. In one embodiment, the inlet segment portion with the constant diameter may have a length of about 0.030±0.005 inches and may have a diameter of about 0.022±0.005 inches. The exit may have a diameter of about 0.032±0.002 inches. The taper may extend at a constant rate from the end of the inlet segment portion with the constant diameter to the outlet.

The baffles or diverters 97 create a tortuous, elongated path in the filter chamber 80 for fluid entering through the mesh 84. The baffles 97 may overlay some, most or all of the holes 86 of the mesh 84. The tortuous, elongated path prevents most, if not all, of any debris in the fluid from converging directly on the inlet segment 126 of the exit path 82. Extending the inlet segment 126 into the filter chamber 80 between the baffles 97 further prevents any debris entering the chamber 80 through the mesh 84 of filter holes 88 from being able to directly converge on the inlet segment 126 of the exit path 82. Instead, when fluid enters, it contacts the baffles 97 and turns in a downward direction. The change in direction causes debris to settle down into the recesses 108 at the bottom of the housing 38 as opposed to being drawn directly to the inlet segment 126 of the exit path 82. In addition to settling out to the recesses 108, any suspended debris is directed to travel primarily around the baffles 97 and then in between the baffles 97 before to entering the exit path 82. A primary path for debris is down below the baffles 97 through the elongated passages 122 and back upward toward the inlet segment 126. This lengthened travel path with directional changes for fluid reduces the velocity and pressure of the flow to the inlet segment 126 of the exit path 82. This helps order any debris in the fluid as it approaches the inlet segment 126 of the exit path 82 and prevents clogging due to multiple particles of debris randomly gathering and clogging inlet segment 126 to the exit path 82. The baffles 97 combined with the small filter holes 86 increases the pressure drop in the filter chamber 80. This also enables the diameter of the outlet 36 of the exit path 82 and the portion 128 of the inlet segment 126 to be larger to achieve the same flow and valve closing speed for a valve using a conventional filter without diverters to create an elongated, tortuous path and reduces the potential for clogging by allowing for a larger exit path.

The inlet segment 126 of the exit path 82 terminates with a blunt end 132. The outlet 60 is surrounded by the conical portion 52 of the barbed end 58. Flat areas are where water droplets can settle and are where minerals can precipitate out of fluids, such as water, when the water dries. These deposits can block an exit path. The barbed end 58 and the blunt end 132 of the inlet segment 126 for the exit path 82 eliminate flat areas for water to collect and calcium carbonate deposits to form.

The filter 12 also will perform better in a line break situation where a large grouping of debris enters a fluid system. In accordance with the foregoing, there will be less potential for clogging of the exit path 82 of the filter 12. The increased area for a larger filter hole mesh 84 will provide redundant filter holes 88 that allows the filter 12 to preform even if many of the holes 88 are blocked.

In manufacturing the filter, the housing and barb fitting can be molded with a pair of cores. This eliminates seams. The baffles and filter holes can be molded using slides in the mold.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the technological contribution. The actual scope of the protection sought is intended to be defined in the following claims.

What is claimed is:

1. A filter for use with a diaphragm of a valve comprising;
    a housing defining a chamber and having a bottom;
    a plurality of inlet holes into the chamber;
    an exit from the chamber; and
    at least one baffle having a front side and an opposite back side, the at least one baffle projecting into the chamber and being downstream of the plurality of inlet holes, at least a portion of the front side and the back side being exposed in an interior of the chamber, the front side and the back side facing in a direction toward the plurality of holes and being spaced from the plurality of holes, the at least one baffle causing at least some of any debris entering the chamber to settle down to the bottom of the chamber.

2. The filter in accordance with claim 1 wherein the at least one baffle in the chamber comprises at least two baffles projecting into the chamber.

3. The filter in accordance with claim 2 wherein the at least two baffles are spaced from the housing.

4. The filter in accordance with claim 3 further comprises at least two spacers to space the at least two baffles from the housing.

5. The filter in accordance with claim 2 wherein the at least two baffles are spaced from one another.

6. The filter in accordance with claim 5 further comprises at least one spacer spacing the at least two baffles from one another.

7. The filter in accordance with claim 6 further comprises at least two spacers to space the at least two baffles from the housing.

8. The filter in accordance with claim 1 further comprises a hinge interconnecting the at least one baffle to the housing.

9. The filter in accordance with claim 8 wherein the housing further comprises a main body having a snap fit interconnection with the bottom.

10. The filter in accordance with claim 1 further comprises a barb connector.

11. A filter for use with a diaphragm of a valve comprising;
    a housing defining a chamber and having a bottom;
    a plurality of inlet holes into the chamber;
    an exit from the chamber;
    at least one diverter extending from the bottom into the chamber and being downstream of the plurality of inlet holes, the at least one diverter causing at least some of any debris entering the chamber to settle down to the bottom of the chamber; and
    a hinge interconnecting the housing and the bottom, and the at least one diverter movable via the hinge from a first position outside the chamber to a second position inside the chamber.

12. The filter in accordance with claim 11 wherein the at least one diverter comprises at least two diverters.

13. The filter in accordance with claim 12 wherein the at least two diverters are spaced from the housing.

14. The filter in accordance with claim 13 further comprises at least two spacers spacing the at least two diverters from the housing.

15. The filter in accordance with claim 11 wherein the at least two diverters are spaced from one another.

16. The filter in accordance with claim 15 further comprises at least one spacer spacing the at least two diverters from one another.

17. The filter in accordance with claim 16 further comprises at least two spacers spacing the at least two diverters from the housing.

18. The filter in accordance with claim 11 further comprises a hinge interconnecting the at least one diverter to the housing.

19. The filter in accordance with claim 18 wherein the housing and the bottom have a snap fit interconnection.

20. The filter in accordance with claim 11 further comprises a barb connector.

21. A valve comprising:
a valve housing defining a passageway interconnecting an inlet and an outlet;
a valve seat along the passageway;
a diaphragm that engages the valve seat to prohibit flow from the inlet to the outlet and that moves away from the valve seat to allow flow to pass from the inlet to the outlet;
a control chamber located on a side of the diaphragm opposite the valve seat; and
a filter attached to the diaphragm to allow flow from the inlet to the control chamber, the filter comprising;
a filter housing defining a filter chamber and including a bottom;
a plurality of inlet holes to the filter chamber;
an exit from the filter chamber to the control chamber; and
at least one baffle having a front side and an opposite back side, the at least one baffle projecting from the bottom into the chamber and being downstream of the plurality of inlet holes, at least a portion of the front side and the back side being exposed in an interior of the filter chamber, and the at least one baffle causing at least some of any debris entering the chamber to settle down to the bottom of the chamber.

22. The valve in accordance with claim 21 wherein the at least one baffle in the chamber comprises at least two baffles projecting into the chamber.

23. The valve in accordance with claim 21 wherein the at least two baffles are spaced from the filter housing.

24. The valve in accordance with claim 23 further comprises at least two spacers to space the at least two baffles from the filter housing.

25. The valve in accordance with claim 22 wherein the at least two baffles are spaced from one another.

26. The valve in accordance with claim 25 further comprises at least one spacer spacing the at least two baffles from one another.

27. The valve in accordance with claim 26 further comprises at least two spacers to space the at least two baffles from the filter housing.

28. The valve in accordance with claim 21 further comprises a hinge interconnecting the at least one baffle to the filter housing.

29. The valve in accordance with claim 28 wherein the filter housing further comprises a main body and a base, the base supporting the at least one baffle and having a snap fit interconnection with the main body.

30. The valve in accordance with claim 21 further comprises a barb connector.

* * * * *